United States Patent [19]

Padovani

[11] 4,132,319
[45] Jan. 2, 1979

[54] AUTOMATIC DEVICE FOR EXTRACTING STACKS OF FINISHED HOLLOW ARTICLES FROM A STACKING STATION OF A HEAT MOULDING APPARATUS

[75] Inventor: Pietro Padovani, Verona, Italy

[73] Assignee: Officine Meccaniche Veronesi (O.M.V.)S.p.A., Verona, Italy

[21] Appl. No.: 787,309

[22] Filed: Apr. 13, 1977

[30] Foreign Application Priority Data

Dec. 6, 1976 [IT] Italy .................. 84964 A/76

[51] Int. Cl.² .................. B65G 59/06; B29C 7/00; B66C 1/42
[52] U.S. Cl. .................. 214/1 BB; 214/6 BA; 214/301; 214/310; 294/86 R; 294/87 R; 425/403.1; 425/453
[58] Field of Search .......... 214/1 BB, 1 BC, 1 BD, 214/147 T, 6 BA, 301, 310, 8.5 K; 425/403.1, 453; 294/16, 67 BC, 86 R, 87 R

[56] References Cited

U.S. PATENT DOCUMENTS 3,411,640  11/1968  Wallis .................. 214/8.5 D
3,559,371  2/1971  Borrowman .................. 294/86 R Primary Examiner—L. J. Paperner
Assistant Examiner—George F. Abraham
Attorney, Agent, or Firm—Bacon & Thomas

[57] ABSTRACT

An automatic device for extracting stacks of finished hollow articles from a stacking station of a heat moulding apparatus. A plurality of vertical rods, rotatable about their longitudinal axes for engagement with stacks of finished articles, are mounted for vertical and horizontal displacement. Control means are provided for controlling engagement and disengagement of the stacks of articles and for controlling vertical and horizontal displacement of the rods in a predetermined sequence.

17 Claims, 7 Drawing Figures

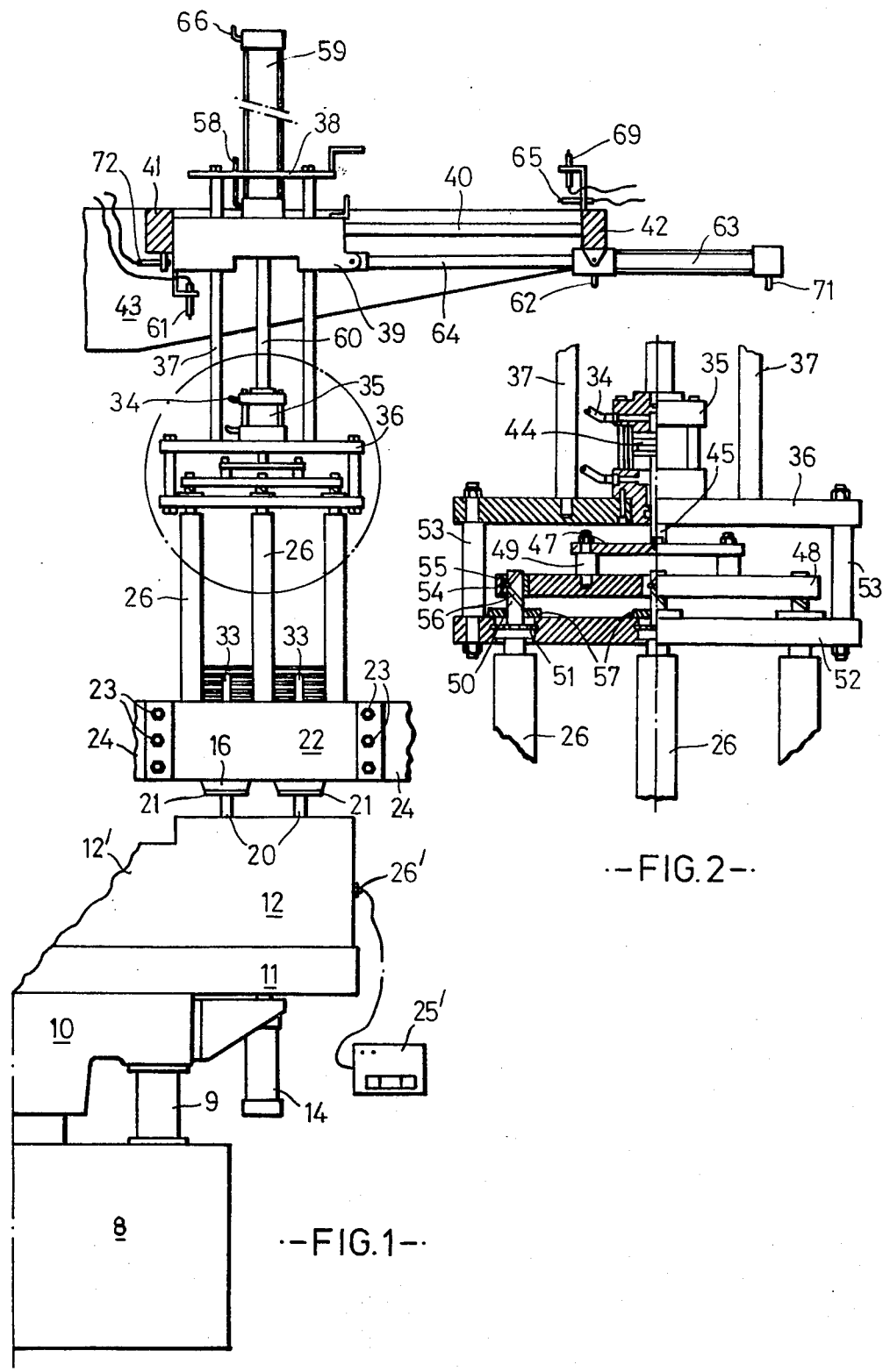

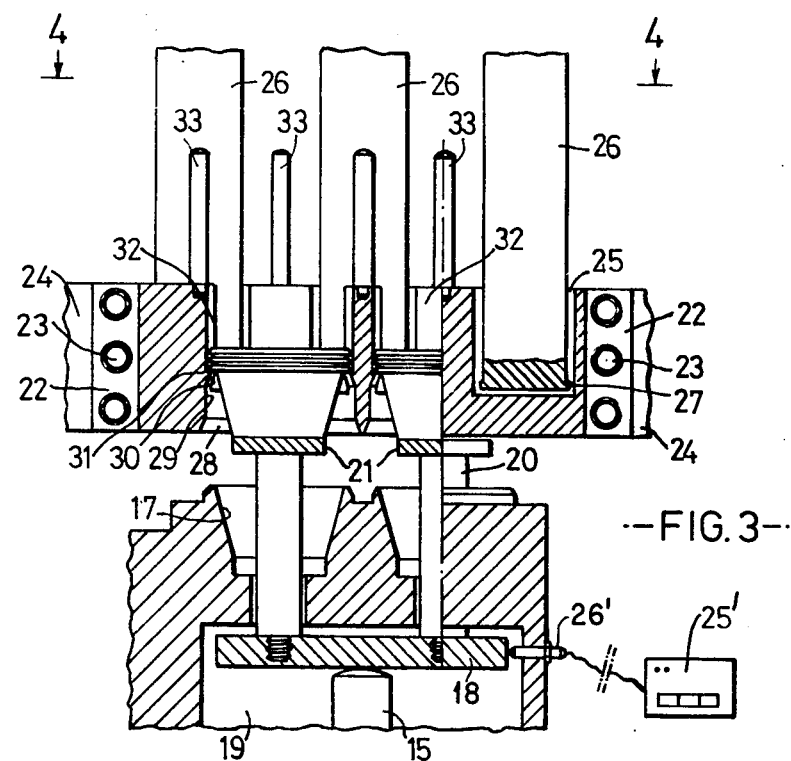
-FIG.3-
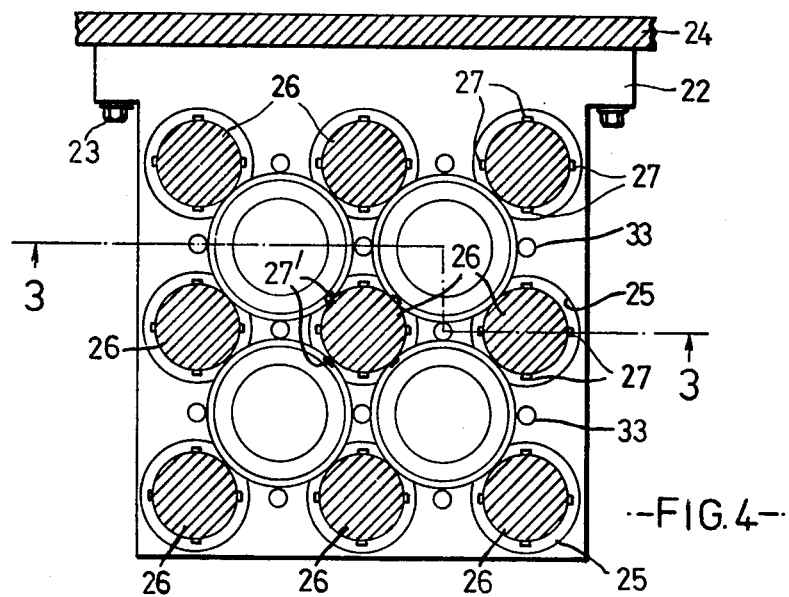
-FIG.4-

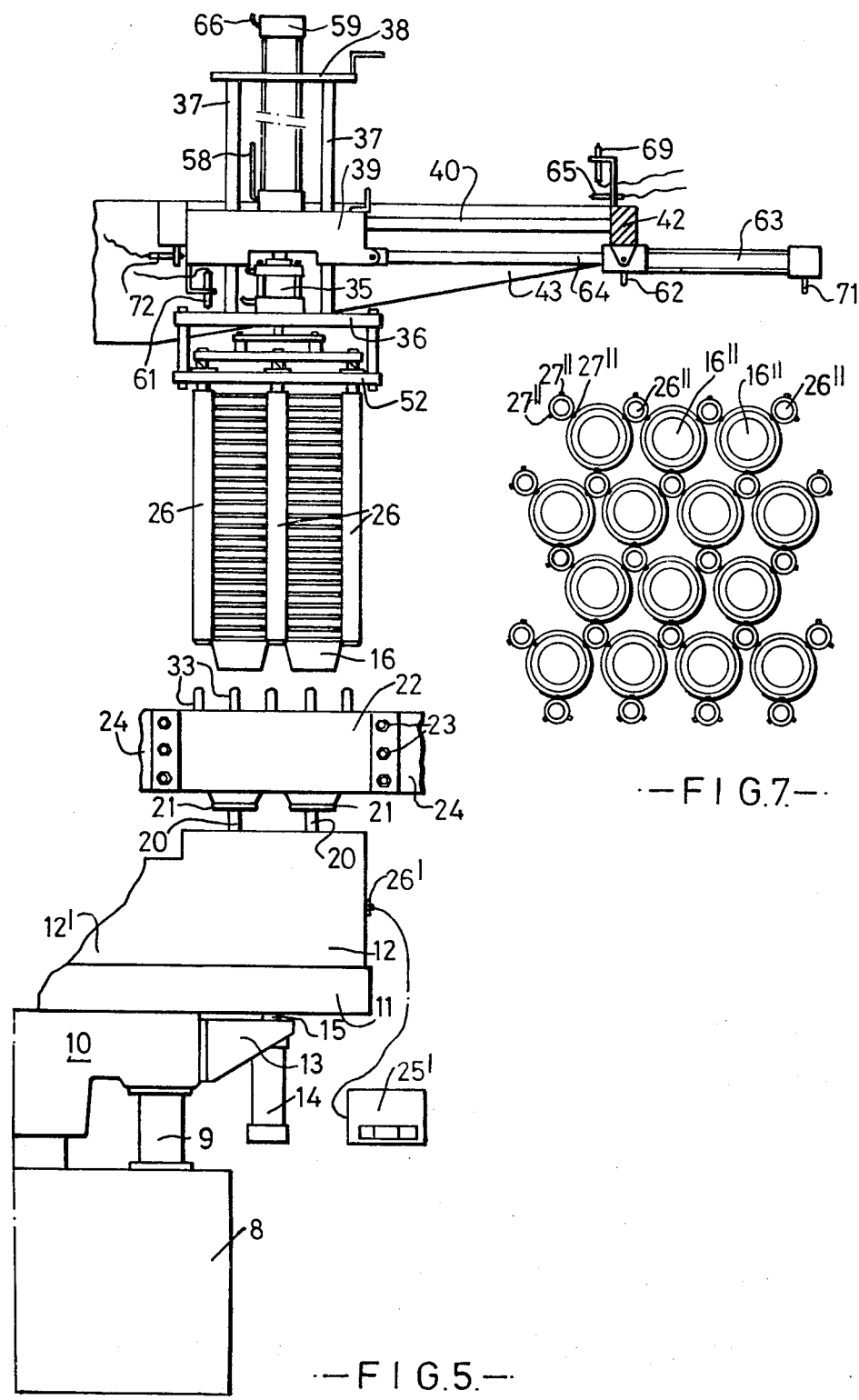

ced alongside a heat moulding apparatus, illustrated schematically. A similar extraction device is provided on the other side of the machine, where there is a heat moulding apparatus having two stacking stations.

AUTOMATIC DEVICE FOR EXTRACTING STACKS OF FINISHED HOLLOW ARTICLES FROM A STACKING STATION OF A HEAT MOULDING APPARATUS

BACKGROUND OF THE INVENTION

The present invention concerns a device to be applied to the stacking station of a heat moulding apparatus producing hollow objects from a sheet of plastics material.

An object of the present invention is to provide a device to extract stacks of finished containers, keeping them in a vertical position during transfer to an unloading station, in an automatic manner without slowing down or stopping the productive cycle of the machine.

SUMMARY OF THE INVENTION

According to the present invention there is provided an automatic device for the extraction of stacks of finished, hollow articles, heat moulded from a foil of plastic material, from a stacking station. The device comprises a fixed frame extending between the stacking station and a discharge station and includes means for enabling engagement and disengagement of the stacks by rods rotatable about their longitudinal axes, means for enabling vertical displacement of said rods, means for enabling horizontal displacement of said rods, means for controlling the engagement of the stacks of objects in the stacking station, means for controlling the extraction of said stacks from the stacking station, means for controlling the disengagement of the stacks in the discharge station and means for returning said rods to the stacking station, wherein at least one of said rods simultaneously engages at least two stacks of objects.

BRIEF DESCRIPTION OF THE DRAWINGS

The present invention will be described further, by way of example, with reference to the accompanying drawings, in which:

FIG. 1 shows a front view, partly in section, of a device according to the invention installed on the stacking station of a moulding apparatus;

FIG. 2 shows, partly in section, on a magnified scale, a ring portion of FIG. 1;

FIG. 3 shows a vertical section of the stacking station taken on the line 3 — 3 of FIG. 4, with the associated mould of the heat moulding apparatus and showing the articles formed by the mould;

FIG. 4 shows the horizontal section of a device taken on the line 4 — 4 of FIG. 3, excluding the end switch of the stacking operation and associated stroke counters and showing the stacks of articles and rods in a quincuncial arrangement.

FIGS. 5 and 6 are views similar to those of FIG. 1, showing the device in the initial and final phases of extraction and unloading respectively;

FIG. 7 shows a cross-section, similar to that of FIG. 3 in which the stacks of objects are in an arrangement in which each rod is engageable with three stacks of articles and each stack of articles is in turn engaged by three rods.

DETAILED DESCRIPTION

Figure 6:
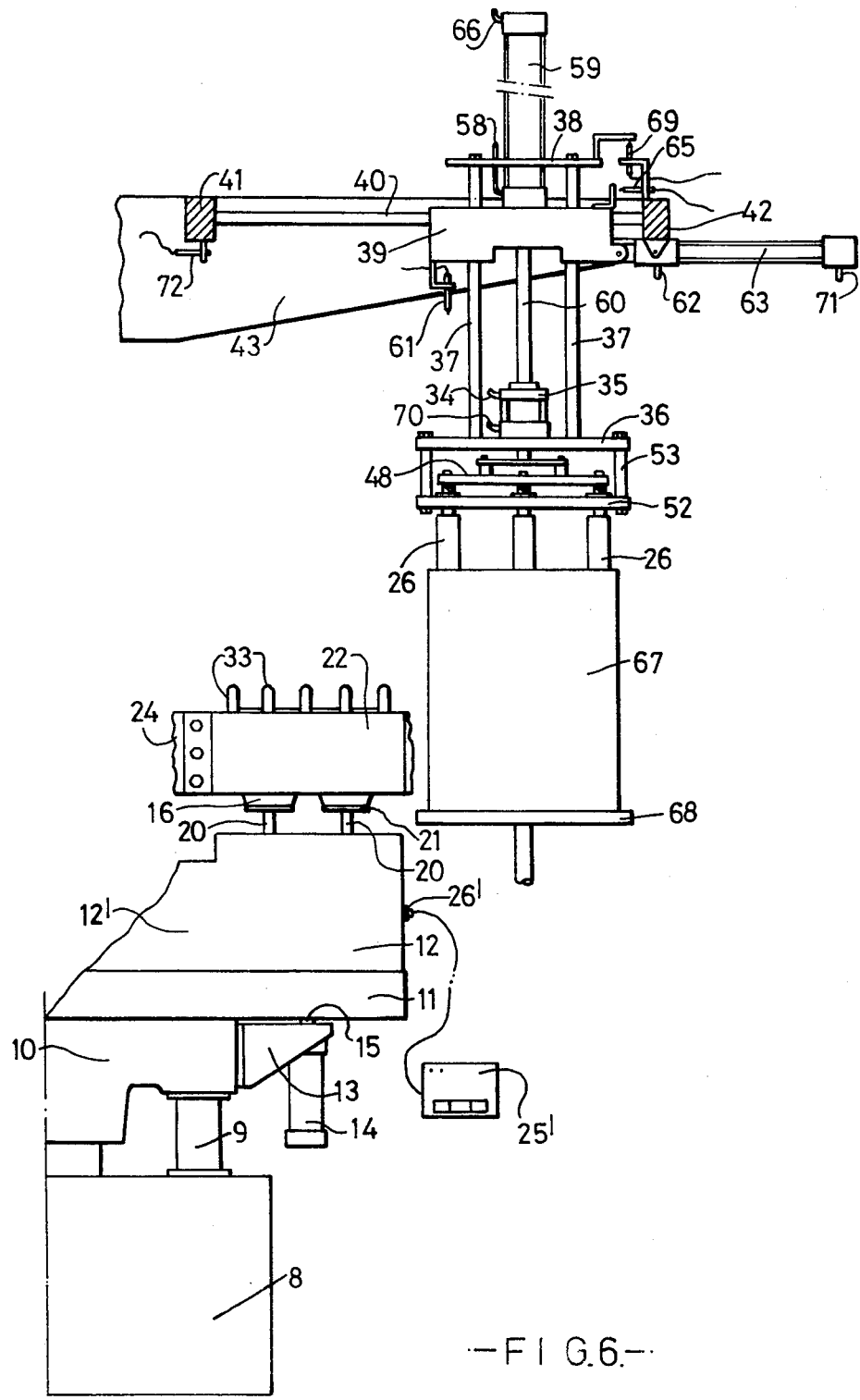

The various Figures are on a varied scale and identical reference numerals correspond to identical or equivalent parts. From FIGS. 1, 5 and 6 it can be seen that the extracting device of the present invention is connected In FIG. 1, the heat moulding apparatus has a base 8, with supporting columns 9 for slidably guiding a plate 10 and bearing a carriage 11 carrying the lower half of a mould 12, 12'. Below the part 12 of the mould are members 13 for supporting a cylinder 14 of a double-acting piston, the rod 15 of which (see FIG. 3) effects the expulsion of frusto-conical cups 16 from the recesses 17 of mould 12, in which they had been formed. The cups 16 are expelled by the action of a plate 18 engaged by rod 15, and displaceable in the cavity 19, on which rods 20 are supported terminating in expulsion plates 21.

Upon the expulsion of the cups 16 from the mould 12 they are then stacked in the stacking station or magazine formed by a plate 22, secured by bolts with nuts 23 to a plate 24 rigidly connected to the frame of the heat moulding apparatus.

The stacking of a series of cups 16 is monitored by a stroke counter 25', actuated by a switch 26'. Said stroke counter is calibrated so as to close a pair of contacts, not illustrated in the drawings, whenever the stacks of cups 16 have reached the number to be removed from the stacking station.

The switch 26' may be installed on the stacking station without departing from the scope of possible embodiments of the invention.

Cylindrical recesses 25 are provided on the plate 22 for receiving the lower ends of rods 26 arranged in an array, having projections 27 engageable with the stacks of cups 16 to retain the stacks of cups within the array of rods, and through bores are provided for the stacking of the cups 16 in separate stacks forming spaced arrays.

Each of the through bores has a frusto-conical enlargement 28, at its lower end connected to a cylindrical wall 29 and terminating in a frusto-conical portion 30 which deflects the upper edges or rims of the cups 16 inwardly as the plate 21 pushes the cups past the frusto-conical portion. There are circular, crown-like portions or shoulders 31, forming the supporting surface for the upper edges or rims of the cups 16 so that the cups will not fall out of the through bores. Above the portions 31 are wall sectors 32 having cylindrical sectors for guiding the stacks of cups 16. A frame of guide rods 33 extends above the associated walls of the sectors 32.

When a number of cups, corresponding to the preset count of the stroke counter 25', has accumulated at the stacking station, the switch 26', via counter 25', closes a pair of contacts inserted in an electric circuit (not shown) provided with valves for controlling double-acting pistons, which will be described later. The pistons form part of a compressed air system (not shown) controlled by means of end switches as will be described hereinafter.

The switch 26' by means of counter 25', the electric circuit and the compressed air system, controls the admission of fluid through input 34 to a cylinder 35 connected to a plate 36 of the extracting device. The plate 36 is disposed on a transversely displaceable carriage 39 by means of the rod 60 secured to the cylinder 35. The rod 60 is the piston rod of a cylinder 59 mounted on carriage 39 which is disposed on bars 40 connecting together cross pieces 41, 42 located above the stacking and discharge stations, said cross pieces 41, and 42 being connected to the frame of the heat moulding apparatus by means of members 43. The admission of fluid through 34 downwardly displaces a piston 44 in cylinder 35 (See FIG. 2). The piston rod 45 of piston 44 is connected to a plate 47, which is connected to a plate 48 via spacers 49. The consequent lowering of the plate 48 causes rotation of the end shafts 50 of the rods 26, rotatably mounted in a plate 52 at 51 which plate is mounted on plate 36 via spacers 53. This rotation of the rods 26 is due to the action of spherical members 54, partly located in bushes 55 provided in plate 48 and engaging in helical grooves 56 in the end shafts 50.

A rotation of 45° of the rods 26 causes projections 27 (See FIG. 4) to be displaced to a position or first orientation where there is engagement, as shown by 27' for the single central rod 26 of FIG. 4. The amplitude of the angles of rotation of the rods 26 is in direct ratio to the distance between the plates 48 and 52, which may be reduced by the insertion of spacers 57 between the plates themselves, or increased by removing said spacers. The embodiment of FIG. 4 shows the rods 26 aligned with the maximum spaces between the stacks of cups 16 and the projections 27 in the minimal spacings. The rods 26 and stacks of cups 16 are in a quincuncial arrangement in which each rod has projections 27 engageable with four stacks of cups and in which each stack of cups is engaged by the projections from four rods.

The end switch 26' simultaneously control the admission of fluid to the cylinder 59 by way of 58, whereby a double-acting piston with its rod 60 secured to the cylinder 25 raises all the parts connected to the plate 36, the movement of which is guided by the uprights 37 passing through the carriage 39 and connected together by cross pieces 38. Consequently, the stacks of containers 16 are also raised until a limit switch 61 located on the carriage 39 is actuated which stops this movement and then controls the admission of fluid through 62 to the cylinder 63, connected to the cross piece 42. A doubleacting piston of cylinder 63 is displaced and the rod 64 displaces the carriage 39, and hence also the stacks of containers 16 to a position over an unloading station when a limit switch 65 stops the displacement of the carriage 39 and simultaneously controls displacement of the piston contained in the cylinder 59 by admission of fluid by line 66 which effects the lowering of the stacks of cups 16 to the unloading station, inserting them, together with the rods 26, into a carton 67 provided on a support table 68.

A limit switch 69, also located on the cross-piece 42 stops the descent of the stacks of cups 16 in the unloading station, and controls the disengagement of the stacks by the admission of fluid at 70 into the cylinder 35 (See FIG. 6) whereby the rod 45 of the piston 44 and the plate 48 are raised and cause the rotation of the rods 26 and associated projections 27 to assume a second orientation effecting the release of the stacks. At the same time, fluid is admitted through 58 to the cylinder 59 which results in raising the device until the limit switch 61 is actuated and then, by admission of fluid at 71 to cylinder 63, horizontal displacement of the carriage 39 from the unloading station to the stacking station is carried out.

The limit switch 72 provided on the cross piece 41 stops the horizontal displacement of carriage 39 and, at the same time, by admission of fluid to cylinder 59 through 66, controls the descent of the device to the stacking station in which the cups 16 have meanwhile continued to be stacked.

The device is therefore ready for making a further extraction of stacks as soon as they reach the number preset in the stroke counter 25'.

With particular reference to FIG. 7 the rods 26" are disposed with their projections 27" in arrangement similar to the cups 16", without the extraction device thereby having to undergo substantial modification relative to those parts forming the above-described invention. In FIG. 7 the rods 26" are aligned with the minimal spacings between the stacks of cups with the projections in the maximal spacings. Each rod 26" has three projections 27", each of which engages a single stack of cups 16" when the rod is rotated to position the projections beneath the rims of three adjacent stacks of cups. In this way the array of rods 26 and the array of stacks are arranged so that each stack of cups is adjacent to three rods.

The rods, provided for simultaneously engaging more stacks, permit moulding with minimum friction between cup and cup, so as to permit the direct admission of the stacks into the despatching cartons. It is also evident that the cylinder 63, instead of being connected to the cross-piece 42 may be connected to the cross-piece 41 without the invention thereby being altered in its essential features.

In summary, it is seen that by arranging the cups 16 in an array of juxtaposed stacks and the rods 26 in an array which compliments the array of stacks, rotation of the rods positions the projections beneath the rims of the lowest cups so that the stacks can be lifted.

I claim:

1. An automatic device for the extraction of stacks of finished hollow articles, heat moulded from sheets of plastic material, from a stacking station of a heat moulding apparatus, the device comprising:

a fixed frame extending between the stacking station and a discharge station, wherein the fixed frame is connected to the heat moulding apparatus and comprises at least two upper cross-pieces which are located above and adjacent to the stacking and discharge stations, and are connected together by at least two bars;

a carriage mounted on the two bars and guided thereby for horizontal displacement;

retaining means carried by the carriage for enabling engagement and disengagement of the stacks, the retaining means including vertical engagement rods having radial projections on lower ends thereof for retaining the stacks therebetween and the engagement rods being rotatable about longitudinal axes thereof;

means connected to said carriage for enabling vertical displacement of the rods;

means connected to the fixed frame for enabling horizontal displacement of the carriage;

operating means including a first double-acting piston and a second double-acting piston wherein the first piston has a cylinder which is connected to the rod of the second double-acting piston and the second double-acting piston has a cylinder which is directly mounted on the carriage; the operating means further including a first plate secured to the cylinder of the first piston, a second plate connected to the first plate by means of spacer sleeves, shafts extending from the upper end of the engagement rods and being rotatably mounted in the second plate, a third plate positioned between the first and second plates and supported by the rod of the first piston, the third plate being provided with through bores receiving the shafts of the engagement rods, cam means formed on the shaft of the engagement rods and engaged by cam drive means on the third plate which rotate the shaft and the engagement rod so as to engage the radial projections on the engagement rods with the stacks of articles to retain the articles between the engagement rods.

2. A device according to claim 1, wherein the means for the vertical displacement of the engagement rods includes the second double-acting piston and cylinder, two or more straight guides connected to the first plate and passing through the carriage and connected together above the carriage by at least one cross-piece.

3. A device according to claim 1, wherein the means for the horizontal displacement of the engagement rods comprises a third double-acting piston, the cylinder of which is connected to the cross-piece above the discharge station and the rod of which is connected to the carriage.

4. A device according to claim 1, further comprising at least one pair of electrical contacts, actuatable by a switch of a stroke counter, said contacts being in an electric circuit including control means for the double-acting pistons which are connected to a compressed air system, and limit switches for arresting the movable parts of the device, at least one of the limit switches controlling the disengagement of the stacks of containers at the discharge station.

5. A device according to claim 1, wherein the amplitude of the angles of rotation of the rods is directly proportional to the distance between the second and third plates, which distance may be adjusted by the interposition of spacers between the first and second plates.

6. A device according to claim 1, wherein the cam means is a helical groove and the cam drive means are spherical members.

7. An automatic device for transferring articles from a first station to a second station comprising:
a magazine at the first station for storing the articles in an array of stacks in which spacings are provided between the stacks;
carriage means for transporting the array of stacks from the first station to the second station, the carriage means including:
an array of rods supported by the carriage means and spaced apart to align with the spacings between the array of stacks to thereby compliment the array of stacks when inserted into the array of stacks wherein each stack is juxtaposed by a plurality of rods;
reciprocating means on the carriage for advancing the array of rods into the array of stacks at the first station and for withdrawing the array of rods from the array of stacks when at the second station;
holding means on each of the rods for engaging stacks juxtaposed therewith when in a first orientation and for disengaging from stacks juxtaposed therewith when in a second orientation wherein each stack is engaged by holding means on a plurality of rods; and
actuating means for moving the holding means between the first and second orientations to retain the array of stacks within the array of rods by engaging the holding means and to release the array of stacks from within the array of rods by disengaging the holding means; whereby the carriage means transports the array of stacks from the first station to the second station after the actuating means moves the holding means to retain the array of stacks within the array of rods, and whereby the actuating means moves the holding means to release the array of stacks from within the array of rods at the second station.

8. The device of claim 7 wherein the carriage means includes means for rotatably mounting the rods and wherein the actuating means includes means for rotating the rods to move the holding means between the first and second orientations.

9. The device of claim 7 wherein the articles are cup-shaped with depending rims and nest within one another to form the stacks and wherein the magazine includes:
an array of bores for receiving the articles wherein the bores are spaced to form the array of stacks of articles and each bore includes shoulder means for retaining the articles therein; and
projecting spaced support means adjacent the bores for stabilizing the stacks as the stacks are formed wherein the projecting spaced support means are out of alignment with the rods.

10. The device of claim 9 wherein the array of stacks and array of rods are arranged with each stack juxtaposed by four rods when the array of rods is within the array of stacks.

11. The device of claim 10 wherein the holding means are projections spaced about the periphery of the rods; wherein the carriage means includes means for rotatably mounting the rods and wherein the actuating means includes means for rotating the rods to move the projections from the second orientations in which the projections are within the spacings between the stacks to the first orientation in which the projections engage stacks of articles juxtaposed with the rods.

12. The device of claim 9 wherein the array of stacks and array of rods are arranged with each stack juxtaposed by three rods when the array of rods is within the array of stacks.

13. The device of claim 12 wherein the holding means are projections spaced about the periphery of the rods; wherein the carriage means includes means for rotatably mounting the rods and wherein the actuating means includes means for rotating the rods to move the projections from the second orientation in which the projections are within the spacings between the stacks to the first orientation in which the projections engage stacks of articles juxtaposed with the rods.

14. The device of claim 7 wherein the array of stacks and array of rods are arranged with each stack juxtaposed by four rods when the array of rods is within the array of stacks.

15. The device of claim 14 wherein the holding means are projections spaced about the periphery of the rods, wherein the carriage means includes means for rotatably mounting the rods and wherein the actuating means includes means for rotating the rods to move the projections from the second orientations in which the projections are within the spacings between the stacks to the first orientation in which the projections engage stacks of articles juxtaposed with the rods.

16. The device of claim 7 wherein the array of stacks and array of rods are arranged with each stack juxtaposed by three rods when the array of rods is within the array of stacks.

17. The device of claim 16 wherein the holding means are projections spaced about the periphery of the rods; wherein the carriage means includes means for rotatably mounting the rods and wherein the actuating means includes means for rotating the rods to move the projections from the second orientation in which the projections are within the spacings between the stacks to the first orientation in which the projections engage stacks of articles juxtaposed with the rods.

* * * * *